United States Patent
Lu et al.

(10) Patent No.: US 9,055,038 B1
(45) Date of Patent: Jun. 9, 2015

(54) APPARATUS, SYSTEM, AND METHOD TO GARBLE PROGRAMS

(71) Applicant: Stealth Software Technologies, Inc., Los Angeles, CA (US)

(72) Inventors: Steve Lu, Torrance, CA (US); Rafail Ostrovsky, Los Angeles, CA (US)

(73) Assignee: Stealth Software Technologies, Inc., Los Angeles, CA (US)

( * ) Notice: Subject to any disclaimer, the term of this patent is extended or adjusted under 35 U.S.C. 154(b) by 56 days.

(21) Appl. No.: 14/061,488

(22) Filed: Oct. 23, 2013

Related U.S. Application Data

(60) Provisional application No. 61/760,600, filed on Feb. 4, 2013.

(51) Int. Cl.
*H04L 29/06* (2006.01)
*H04L 9/08* (2006.01)

(52) U.S. Cl.
CPC ......... *H04L 63/0428* (2013.01); *H04L 63/0442* (2013.01); *H04L 9/08* (2013.01)

(58) Field of Classification Search
CPC .... H04L 63/0428; H04L 63/0442; H04L 9/08
USPC ........................................................ 713/150
See application file for complete search history.

(56) References Cited

U.S. PATENT DOCUMENTS

| | | | |
|---|---|---|---|
| 5,123,045 A * | 6/1992 | Ostrovsky et al. | 713/190 |
| 6,834,272 B1 * | 12/2004 | Naor et al. | 705/80 |
| 2003/0126458 A1 * | 7/2003 | Teramoto et al. | 713/194 |
| 2004/0059928 A1 * | 3/2004 | Fujiwara et al. | 713/189 |
| 2007/0136606 A1 * | 6/2007 | Mizuno | 713/189 |
| 2011/0110525 A1 * | 5/2011 | Gentry | 380/285 |
| 2011/0211692 A1 * | 9/2011 | Raykova et al. | 380/46 |
| 2011/0216902 A1 * | 9/2011 | Kolesnikov | 380/47 |
| 2012/0070000 A1 * | 3/2012 | Baechler et al. | 380/255 |
| 2012/0213359 A1 * | 8/2012 | Troncoso Pastoriza et al. | 380/28 |
| 2012/0233460 A1 * | 9/2012 | Kamara et al. | 713/168 |

* cited by examiner

*Primary Examiner* — Hadi Armouche
*Assistant Examiner* — Shahriar Zarrineh
(74) *Attorney, Agent, or Firm* — Cooley LLP

(57) ABSTRACT

In one embodiment, a non-transitory computer readable storage medium includes executable instructions to perform a series of operations represented by a first garbled program received from a client on garbled data received from the client. A second garbled program is obtained as a result of execution of the first garbled program. The second garbled program includes a first garbled portion and a second garbled portion. The second garbled portion includes a third garbled portion generated through execution of the first garbled portion, such that the series of operations can be performed without interaction with the client and while maintaining as hidden the underlying content of the first garbled program and the garbled data.

11 Claims, 2 Drawing Sheets

APPARATUS, SYSTEM, AND METHOD TO GARBLE PROGRAMS

CROSS REFERENCE TO RELATED APPLICATION

The present application claims the benefit of commonly owned U.S. Provisional Patent Application No. 61/760,600, entitled "Apparatus, System, and Method to Garble Oblivious RAM Programs," filed on Feb. 4, 2013, which is incorporated herein by reference in its entirety.

FIELD OF THE INVENTION

The invention generally relates to data processing in computer networks. More particularly, the invention relates to an apparatus, system, and method to garble programs, such as random access memory (RAM) programs.

BACKGROUND

In cloud computation, a client may want to store some data remotely and then have a remote server perform computations on that data. If the client does not wish to reveal this data, the nature of the computation, and the results of the computation to the remote server, then secure computation should be performed in order to process this remotely stored data.

In some approaches for performing secure computation, a program may need to be converted to a circuit, such as under the garbled circuits paradigm (see, for example Yao's garbled circuits in Andrew Chi-Chih Yao, "Protocols for secure computations" (extended abstract), in *FOCS*, pages 160-164, 1982) or the randomized encoding paradigm. However, many algorithms are more naturally and compactly represented as RAM programs, and converting these into circuits may lead to a significant increase in program size and execution time. Although there are polynomial transformations between time-bounded RAM programs and circuits, it is desirable to circumvent these transformation costs and execute RAM programs directly in a private manner, while retaining the same noninteractive properties as garbled circuits. It is also desirable to execute these RAM programs on the remote server without needing interaction with the client during program execution.

It is against this background that a need arose to develop the apparatus, system, and method described herein.

SUMMARY

One aspect of the invention relates to a non-transitory computer readable storage medium. In one embodiment, the non-transitory computer readable storage medium includes executable instructions to perform a series of operations represented by a first garbled program received from a client on garbled data received from the client. A second garbled program is obtained as a result of execution of the first garbled program. The second garbled program includes a first garbled portion and a second garbled portion. The second garbled portion includes a third garbled portion generated through execution of the first garbled portion, such that the series of operations can be performed without interaction with the client and while maintaining as hidden the underlying content of the first garbled program and the garbled data.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings. In the drawings, like reference numbers denote like elements, unless the context clearly dictates otherwise.

DETAILED DESCRIPTION

Figure 1:
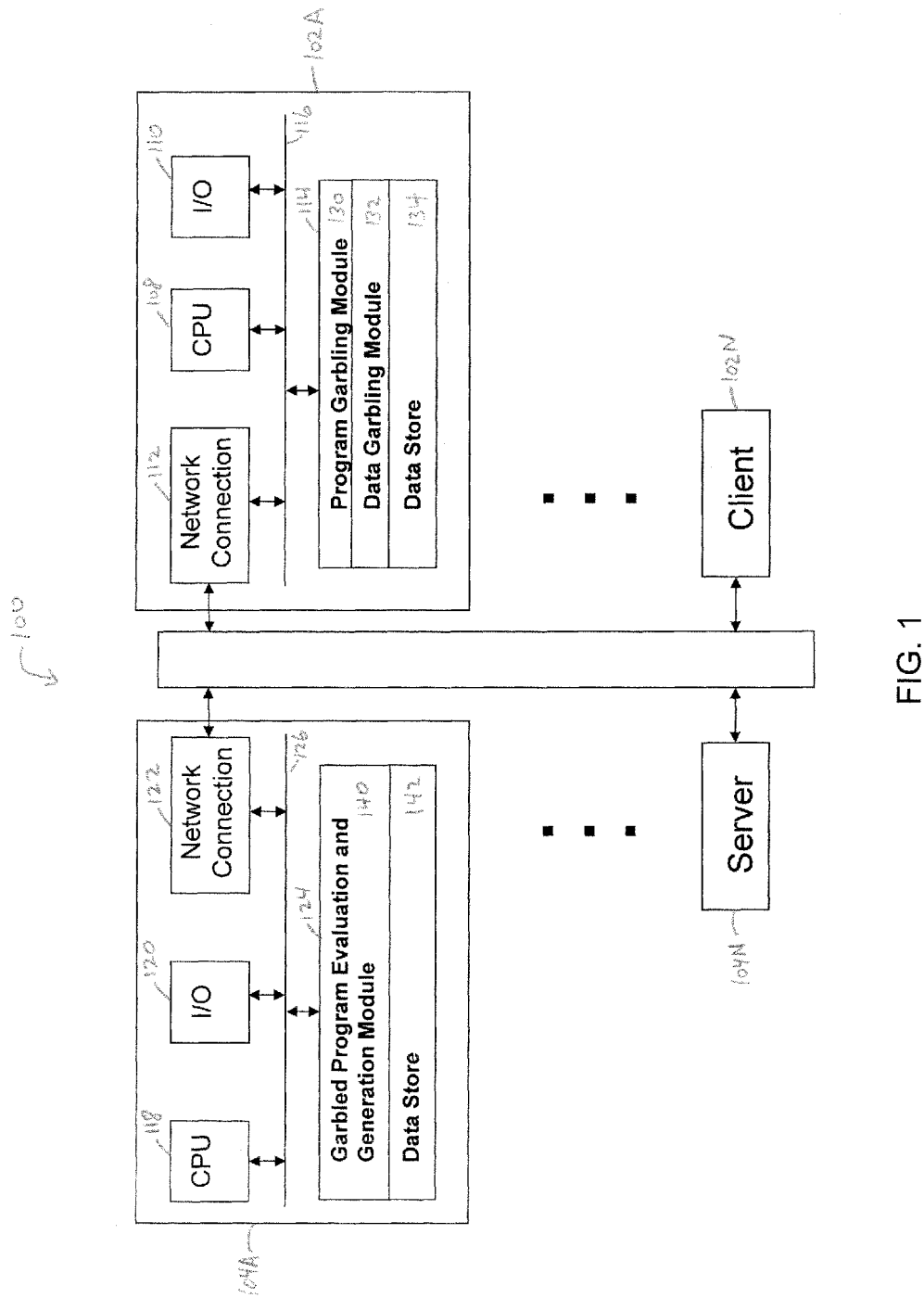
FIG. 1 illustrates a system for garbling programs such as oblivious RAM programs, in accordance with an embodiment of the present invention.

One goal of an embodiment of the invention is to enable a client to store data remotely and have a remote server perform computations on that data, without revealing the data, the nature of the computation, and the results of the computation to the remote server. To achieve this, an embodiment of the invention enables a remote server to perform a series of operations represented by a garbled program received from a client on garbled data received from the client. The series of operations can be performed without interaction with the client and while maintaining as hidden the underlying content of the garbled program and the garbled data.

In one embodiment, one can non-interactively first garble the circuit and transmit it during an "offline" phase, then when online inputs are present, the input and program can be separately garbled and sent to the evaluator. This achieves a benefit of this non-interactive online/offline garbling paradigm for RAM programs: it can garble a large memory through pre-processing and then separately garble a program and inputs that can be run online on this garbled memory. The evaluator running the garbled program learns only the output of the program and the running time of the program.

In one example, we will have Alice send a garbled program to Bob, so that Bob can execute it. Take any RAM program, and first have Alice prepare an initial state of Oblivious RAM (i.e. memory and initial encrypted state of the CPU of the Oblivious RAM.) One goal of an embodiment of the invention is for Alice to send information to Bob that allows Bob to execute oblivious RAM without interaction with Alice and while maintaining as hidden the underlying content of the garbled program and the garbled data. Examples of how this can be done are described below.

In one example, the CPU of Oblivious RAM (ORAM) performs a series of operations in t steps. In one example, each CPU step can be implemented as a garbled circuit (described in more detail below), where the previous step feeds its garbled configuration/state to the next garbled CPU computation step. Thus, t ORAM CPU steps can be implemented as t garbled circuits, one for each step, with inputs of one garbled circuit feeding into the next. The challenge is to implement read/write calls to ORAM memory at the remote server without any interaction between the client and the remote server, and while maintaining as hidden the underlying content of the garbled program and the garbled data. How can we do this? There are two issues, how to issue read instructions to memory from garbled circuits and how to read back data that has come from ORAM memory into next ORAM CPU step, represented as another garbled circuit. For the reading back, the garbled circuit and the data stored in ORAM memory should be in corresponding garbled format (i.e. right keys for right wires) for the next CPU step, as we don't want any interaction to be needed between the client and the remote server.

In one embodiment of the invention, we can keep that ORAM memory encrypted using an encoding, i.e. for each memory location, and any ORAM epoch define two keys, one corresponding to "0" and another corresponding to "1". To encrypt the bit, in ORAM memory put the right key into every bit position in ORAM memory. In one embodiment, this encoding is set to be a Yao key that encodes a bit "b" at location "u" in epoch "t". In another embodiment, this encoding is set to be a Pseudo-Random Function (PRF) output applied to t, u and b. That increases ORAM memory by a factor of k, the security parameter.

Now, consider what the ORAM CPU does when it reads a sequence of locations in ORAM memory: it first outputs in the clear the memory location(s) it wants to read in ORAM memory. We can have a Yao's garbled circuit (of the i-th ORAM CPU step) output in the clear the memory locations that it wants to read next as well (i.e. what the next garbled circuit that represents the next ORAM CPU step needs as an input). But after it reads the location, how does the next step of the CPU (represented as another garbled circuit) process content that comes from ORAM memory? Recall that the ORAM CPU does various small logical steps such as decrypt (using a pseudo-random function (PRF)) to interpret what it got from the ORAM memory and how to process it depending on its current state. Now, one can describe this logic as a small (i.e. polynomial in the security parameter) circuit for interpreting data that comes from ORAM memory. But this logic can depend on the location that the ORAM CPU wants to read, since recall that different locations have different encodings of 0's and 1's that depend on the epoch and the actual location. We may not know what the next location is since this depends on the program execution path.

In one embodiment of the invention, the ORAM CPU circuit can compute a bit representation of another garbled read circuit that can then be executed against the specific ORAM memory location(s) that are also conveniently encrypted in Yao style format. The computation to output another garbled circuit is also small, so we can have garbled circuit output (in the clear) to another garbled circuit that can read and process specific ORAM locations, encrypted in Yao-style. Together with the bit representation of the read circuit the ORAM CPU circuit can thus output the actual memory location(s) that it wants to use as inputs to such a read circuit (in the clear). In one embodiment, this new read circuit can be compiled on the fly. The reason this new "read circuit" should be compiled on the fly is that Yao's circuit construction depends on the specific memory locations it wants to read from ORAM memory, and thus depends on the program execution path. It is typically not known a-priori.

The garbled ORAM CPU step can output a bit representation of another garbled circuit that can read and interpret the specific locations that are being read from ORAM memory (recall that they are conveniently already encoded as keys for Yao's garbled circuit) that can be fed into the garbled circuit for the next ORAM CPU step. The cost of each ORAM garbled CPU step can therefore remain polynomial in the security parameter.

We note the following regarding the size of the resulting garbled program. If the program runs in t steps, in one embodiment the program can be associated with t garbled circuits. However, in another embodiment, a single reusable garbled circuit can generate the (non-reusable) garbled circuit for each of the t steps. The garbled program therefore can depend on the size of the original program, and not on the running time. We go into further detail in our description below.

FIG. 1 illustrates a system 100 for garbling programs such as oblivious RAM programs, in accordance with an embodiment of the present invention. The system 100 includes a transmission channel 106 connecting client computers 102A-102N with server computers 104A-104N. The transmission channel 106 may represent a network, such as a packet-switched network (such as the Internet) or a circuit-switched network. Each client computer 102 includes standard components, such as a network connection 112, a CPU 108, and an input/output device 110, which communicate over a bus 116. The memory 114 stores a set of executable programs that may be used to implement functions of embodiments of the invention. Similarly, each server computer 104 includes standard components, such as a network connection 122, a CPU 118, and an input/output device 120, which communicate over a bus 126. The memory 124 stores a set of executable programs that may be used to implement functions of embodiments of the invention.

In an embodiment of the invention, the memory 114 includes executable instructions establishing the various modules of the client 102 shown in FIG. 1. The program garbling module 130 generates a garbled program that the client 102 can provide to the server 104. The client 102 may provide the server 104 multiple garbled programs (such as one for each of t processing steps), or alternatively may provide the server 104 a reusable garbled program that can generate a garbled program for each of t processing steps upon execution by the server 104. The data garbling module 132 generates garbled data that the client 102 can provide to the server 104. The data may include both processor state information and data to be stored in memory. The data store module 134 may read data from and write data to the memory 114.

In an embodiment of the invention, the memory 124 includes executable instructions establishing the various modules of the server 104 shown in FIG. 1. The garbled program evaluation and generation module 140 can execute, for example, a garbled program (such as an oblivious RAM program) received from the client 102 and/or a garbled program obtained at the server 104 as a result of execution of a garbled program received from the client 102. The data store module 142 may read data from and write data to the memory 124.

The modules in memories 114 and 124 are exemplary. The function of individual modules may be combined. In addition, the modules associated with a client 102 may reside on a single computer 102A, or may be distributed across a network. Similarly, the modules associated with a server 104 may reside on a single computer 104A, or may be distributed across a network.

In one embodiment, we would like to have a garbled circuit (G-ckt) for implementing each computation step of the CPU. In this way, a series of ORAM CPU operations is emulated. The ORAM CPU can do additional work "servicing" ORAM read/write from memory, including checking signatures, etc.

In one embodiment, the i-th G-ckt (emulating the i-th computation step and executed by the garbled program evaluation and generation module 140) takes representations of the contents of the CPU's registers and representations of the authenticated memory-cell contents (i.e., the contents in some specific address s), and produces (i) representations for the updated contents of the CPU registers, (ii) a representation of the updated (& authenticated) memory locations, and (iii) the address to be read next (authenticated too). The representation used in (i) may be the one that fits the i+1-st G-ckt. In addition, the i-th G-ckt can output (in the clear) a small part of the description of the i+1-st G-ckt. This part will be able to "translate" encoding from ORAM memory into the correct representation for the i+1-st G-ckt. This is the part of the i+1-st G-ckt that can be computed on the fly. So we are not adjusting the representation that is stored in ORAM memory, but rather we are adjusting the reading of the G-ckt for step i+1 during the i-th step. Note that the i-th G-ckt already knows which location the i+1-st ORAM CPU step needs to read. We will explain that in further detail below.

In one embodiment, we emulate an ORAM CPU reading ORAM memory, rather than an arbitrary CPU reading an arbitrary memory location. In this embodiment, the ORAM CPU reading pattern has an important feature that we exploit: recall that in ORAM, the ORAM CPU does not know when any particular value from memory will be read, but it is known when any particular value in an ORAM hierarchical solution was written last: during the last re-shuffling stage for any particular buffer. So imagine that the G-ckt of the i-th step of the ORAM CPU determines that it wants to read some particular location in some particular buffer. The i-th G-ckt can output in the clear which location the i+1-st G-ckt want to read: i.e. to read some particular bit(s) in a particular buffer. It is known ahead of time a seed s that was used to encrypt that buffer (using a PRF), where the seed s depends on the "epoch", i.e. when that buffer was last "re-shuffled" and completely re-written.

In this embodiment, the ORAM memory (i.e. all bits in all buffers) is encrypted bit by bit using the following encryption: for every bit location in the buffer we will denote two keys in Yao format using the PRF that depends on the epoch number, on the actual address of that bit in the buffer and the actual bit value (i.e. 0 or 1). If the bit is 0, the PRF will output the encryption key that will represent the key representing 0. If the bit is 1, it will represent the key representing 1.

In this embodiment, every bit of ORAM memory is expanded into an encryption key and written in this fashion. Note that these two keys can be computed using a PRF given an epoch number and an address of that bit using computation that is a fixed polynomial in the security parameter. (Note that this is Yao-compatible encoding of ORAM memory, where every bit is represented as a key that can be used inside Yao's garbled circuits.)

In one embodiment, suppose G-ckt of step i has determined that during the i+1-st step of the ORAM CPU, the i+1-st G-ckt wants to read some location address z in a particular buffer in some particular epoch. The G-ckt of step i can compute a representation of two possible keys stored at that address, one value corresponding to bit 0, and another value corresponding to bit 1. It does not know the value stored at that address, but it knows that this address has one of the two keys. These keys can be thought of as one of the two "input" keys corresponding to standard Yao's garbled circuits, which we refer to below as Yao keys. For a given bit, the memory contains one of the two Yao keys, but not both. Next, the i-th G-ckt can then output in the clear a bit-representation of another garbled circuit that uses in its tables these two Yao keys. The i-th G-ckt can map these Yao keys to the fixed keys that are needed for the i+1-st G-ckt, such as by creating a translation which uses these two possible Yao keys sitting in memory to encrypt a translation to other keys that the i+1-st G-ckt needs.

In this embodiment, if we output such a translation G-ckt in the clear (which is what the i-th G-ckt does, among other things), this G-ckt can read a specific bit memory location in the buffer of a specific epoch and use its Yao keys to feed into an on the fly generated G-ckt to translate the encoding written in ORAM memory into encoding that the i+1-st CPU expects. This is a fixed computation that can compute PRF's and Yao-compatible translation tables that can be outputted in the clear.

This circuit (which can be generated on-the-fly) can read a particular bit from a specific memory address (that is represented as a Yao key), and translate it into the representation of that bit (i.e. to another key) that the i+1-st G-ckt can read. Note that this "translation" is of polynomial size in the security parameter.

Figure 2:
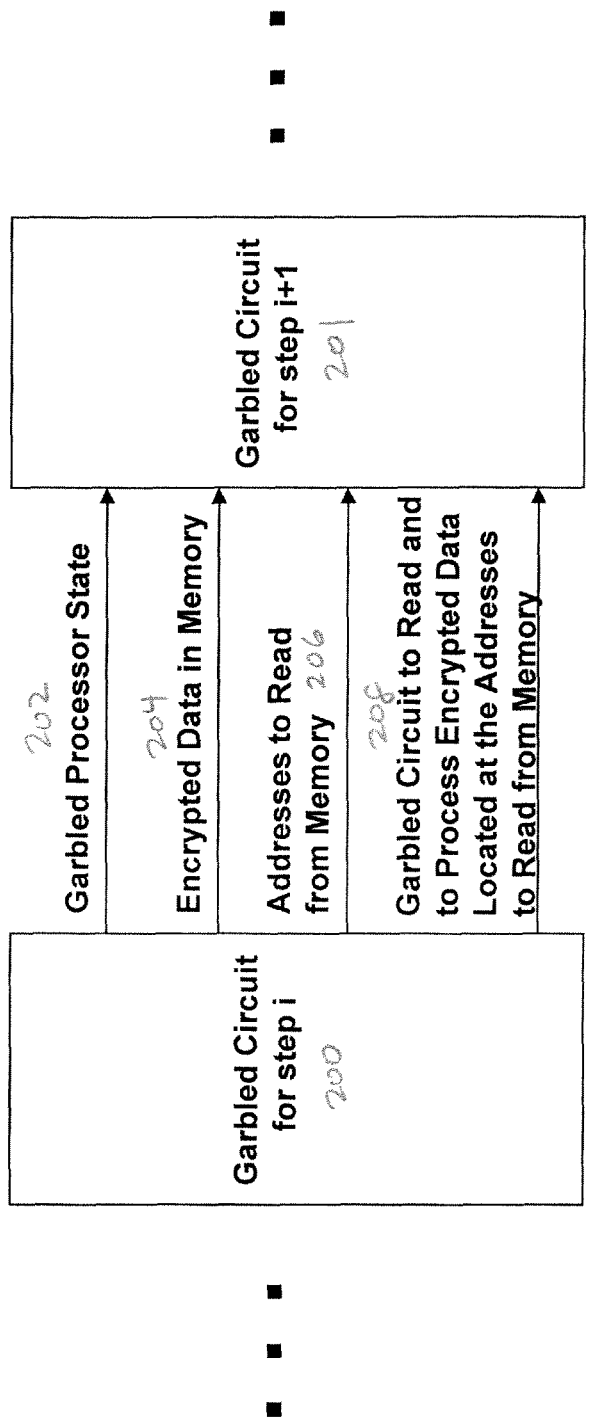
FIG. 2 illustrates information provided by a garbled circuit for an i-th step of program execution to a garbled circuit for an i+1-st step of program execution, in accordance with an embodiment of the present invention.

In one embodiment, the on-the-fly translation can be performed as follows: it takes a key stored in ORAM as an input key for the G-ckt to be produced. The i-th G-ckt has a garbled representation of a seed to a PRF that allows it to compute both possible input keys potentially stored in ORAM in that particular location at that particular time, so the G-ckt can output in the clear a bit representation of the description of a new G-ckt (i.e. its garbled tables, etc.) that translate the key that is stored in ORAM memory at a specific location into a key that the i+1-st G-ckt needs. The description of this new translation G-ckt is outputted in the clear, and becomes part of the i+1-st G-ckt description. So, for example, each G-ckt 200 for each i-th step of the ORAM CPU can output four things to each G-ckt 201 for each i+1-st step of the ORAM CPU, as shown in FIG. 2:

(1) The garbled processor state 202 (for the next i+1-st state).

(2) Encrypted data in memory 204, such as a top-level buffer. This data can be encrypted using Yao keys, and this re-writing of data in memory can be output in the clear.

(3) Addresses to read from memory 206. These addresses can refer to a description of bit addresses that the i+1-st G-ckt wants to read from ORAM memory (emulated by the memory 124 shown in FIG. 1).

(4) Garbled circuit 208 to read and to process encrypted data located at the addresses to read from memory 206. The garbled circuit 208 can refer to, for each address from (3), the new "translation" G-ckt (that was compiled on the fly with the knowledge of (3)) that is included in the i+1-st G-ckt. The garbled circuit 208 can be output in the clear.

In one example, as described herein, a second garbled program obtained as a result of execution of a first garbled program (such as a garbled program provided to the server 104 by the client 102 in FIG. 1) includes a first garbled portion and a second garbled portion. The first garbled portion may be, but is not limited to, the i-th G-ckt 200 (see FIG. 2). The second portion may be, but is not limited to, the i+1-st G-ckt 201 (see FIG. 2). The i+1-st G-ckt 201 may include a third garbled portion generated through execution of the i-th G-ckt 200. The third garbled portion may be, but is not limited to, the "translation" G-ckt. As the "translation" G-ckt is generated through execution of the i-th G-ckt 200, the series of operations represented by a garbled program can be performed without interaction with the client 102 (see FIG. 1) and while maintaining as hidden the underlying content of the first garbled program and garbled data (such as garbled data from the client 102).

In one example, the i-th G-ckt 200 is executed to obtain first encrypted data elements (such as portions of the garbled processor state 202 and/or the encrypted data in memory 204 in FIG. 2), addresses associated with the encrypted data elements (such as the addresses to read from memory 206 in FIG. 2), and the third garbled portion (such as the garbled circuit 208 to read and to process encrypted data located at the addresses to read from memory 206 in FIG. 2). The i+1-st G-ckt 201 may be executed to obtain second encrypted data elements based on the first encrypted data elements.

In one embodiment, to generate a garbled program that runs in t steps, we can make t of these G-ckts that generate sub-circuits for the underlying ORAM computation. If one chooses t to be worst-case, this potentially affects the benefits of performing RAM program computation against the circuit model of the computation (which may run in the worst-case time). As such, we would like to achieve compactness: the garbled program should depend on the size of the original program and not the running time. In order to do so, we can make use of reusable garbled circuits. For example, we can use a single reusable garbled circuit instead of t G-ckts. At each time step, the circuit can emulate the i-th G-ckt and can also output in the clear whether or not the garbled program has halted. For each time step i, this reusable circuit emulates the i-th G-ckt: it generates the underlying CPU garbled circuits which in turn output tokens that feed into the i+1-st G-ckt. However, this reusable circuit also plays the role of the i+1-st G-ckt, so the tokens are for its own consumption. This reusable circuit remains secure when it generates outputs that are keyed with its input encoding, which we refer to as Key-Dependent (KD) security.

In one embodiment, as described above, every bit of memory can be represented as a Yao key. An oblivious RAM approach can be used such that for any time t and for any memory location w there exists a polynomial-time algorithm (polynomial in the security parameter) that can compute two potential keys that are used in that location, one representing a 0 and another representing a 1. A Key-Dependent-secure (KD-secure) reusable garbled circuit can be used to achieve compactness. Furthermore, the online evaluation can have a CPU step output such that the program halts and provides output in the clear at each step. The program may recommence and run for a time interval depending on each particular input.

In one embodiment, the technique can be utilized in the Beaver-Micali-Rogaway paradigm (see D. Beaver et al., "The round complexity of secure protocols", in Proceedings of STOC '90, Proceedings of the twenty-second annual ACM symposium on theory of computing, pages 503-513) to achieve constant-round MPC, replacing garbled Yao circuits with garbled oblivious RAM based on the approaches described above.

Additional Material Describing Exemplary Embodiments

The below additional material relates to one or more exemplary embodiments of the invention, and should not be construed as limiting.

An Approach for RAM Program Garbling

We describe our approach at a high level: we start with an ORAM compiler that takes a program and converts it into an oblivious one. We call this new program the "ORAM CPU" because it can be thought of as a client (such as client 102 in FIG. 1) running a CPU that performs a local computation followed by reading or writing something on the remote server. As a conceptual segue, consider the following change: instead of the ORAM CPU locally performing its computation, it creates a garbled circuit representing that computation, and also garbles all the inputs for that computation (the inputs are just the client state and the last fetched item, possibly with some randomness) and sends it to the server who then evaluates the circuit. The output of this computation is just the next state and the next read/write query, and the server performs the read/write query locally, and sends back the result of the read/write query along with the state to the ORAM CPU. We emphasize that this is just a conceptual intermediate step, since this step does not actually give us any savings and possibly interferes with the security of the ORAM CPU by having its state revealed to the server.

Next, we change where the ORAM CPU state is stored: instead of letting the client hold it, it is stored on the server in garbled format. That is to say, the garbled circuit that the client sends to the server now outputs a garbled state instead of a regular state, which can then be used as input for the next ORAM CPU step. As long as the garbled circuit for the next CPU step uses the same input encoding as the one generated by our current CPU step, then the client does not need to interact with the server. However, the garbled CPU (such as CPU 118 in server 104 in FIG. 1) also performs read/write operations into ORAM memory (such as memory 124 in server 104 in FIG. 1) that need to be carefully interleaved with our computations. We describe how this is done next.

Let us suppose that the ORAM compiler had the property that the ORAM CPU knows exactly when the contents of a memory location that it wants to read next was last written to (which is the case for many ORAM schemes). We attempt to perform the same strategy as we did with garbling the state: whenever the ORAM CPU wants to write something to memory. We store memory bits as Yao's garbled keys, based on the actual location, and the time last written. Thus, the bit stored in some particular location has one of the two garbled keys. However, this does not immediately work, because if each memory location uses a different encoding, the CPU circuit does not know which encoding to use when reading at some future time.

In order to resolve this, we construct a circuit that assists with this transition: the circuit takes as input a time step and memory location computes (in a garbled form) two possible encodings for 0/1 encoded in this location and outputs a garbled circuit encoded for that time step to "translate" keys stored in memory to keys needed by the CPU. Since this circuit does not require the knowledge of the memory location ahead of time, the client can generate as many of these as needed at the start of the computation. Indeed, if the ORAM program runs in t steps, the client can generate t of these circuits, garble them, and send them all to the server, non-interactively.

Note that we need Oblivious RAM with poly-log overhead where the client size is at most some fixed polynomial in the security parameter times some poly-log factor in n. This is because for every ORAM fetch operation, we also need to emulate the client's internal computation of the Oblivious RAM using garbled circuit, which incurs a multiplicative overhead in the size and the running time of the client. Thus, the smaller the client of Oblivious RAM, the more efficient our solution is: in order to achieve poly-log overhead, Oblivious RAM schemes where client memory is larger than poly-logarithmic are not useful for our purposes. Below, we give the main construction for garbled RAM programs. When combined with oblivious transfer, this gives a one-round secure two-party RAM program computation. We also give a direct construction for a single-round ORAM. This follows from our general result, but in case where only single read/write is needed this gives a more direct construction which may be useful in some of the applications.

In one embodiment, the model for RAM computation is as follows: there is a memory or database D of size N, a program $\pi$, and an input x. We can think of loading the program and input into special portions of the memory (e.g. stored programs model), and running the program by executing CPU steps. The CPU can be a small circuit which takes as input a state $\Sigma$ and some input information (in particular, a bit that is read from memory), and outputs an updated state $\Sigma'$, an I/O command to D and some output information.

In one embodiment, a garbled RAM (GRAM) scheme is a tuple of algorithms that can: (1) set up a secret garbling key gsk, (2) garble the memory contents D using gsk, (3) garble the program and input using gsk, (4) garble the CPU steps using gsk, and (5) evaluate the garbled contents without gsk.

The way a bit b stored in memory location u written at time (or epoch) t stored in the contents of memory can be an encoding of (t||u||b), e.g. $F_k$(t|u|b). Both the memory D, and the program and input can be stored using this encoding.

In one embodiment, to enable an evaluator to run the program, we can also garble the CPU steps and allow them to be chained together. Each garbled CPU step i takes as input a garbled state, a garbled input bit a (read from memory), the garbling of the PRF key k, the garbling of the current timestep i, and the garbled encoding e of the next garbled CPU step (and possibly garbled hardwired randomness). In this embodiment, only the state and input bit are dynamic and program dependent. The other inputs are known and can be fixed in advance by the garbler. The garbled CPU outputs a new garbled state (now garbled under the following CPU step's encoding) and read/write information.

In one embodiment, for read instructions, the garbled CPU outputs a memory location u in the clear, and by predictive memory it knows it was last written to at, say, timestep j, so it also outputs a "translation table" that allows for the chaining of CPU steps. One embodiment is of the form T=($F_k$(j||u||0) XOR $e_a$(0), $F_k$(j||u||1) XOR $e_a$(1)), where $e_a$ is the encoding function for the input bit a for the next CPU step. Note that if bit b is stored in memory, then the garbled value within is precisely $F_k$(j||u||b), which allows the evaluator to decode $e_a$(b) which is fed into the next CPU step.

In one embodiment, for write instructions, the garbled CPU outputs a memory location v in the clear, and also outputs the properly encoded value, e.g. $F_k$(i||v||b).

In one embodiment, to evaluate a garbled program, the CPU can execute the individual garbled CPU steps by invoking the evaluation algorithm of the underlying garbled circuit scheme. It is given as output a new garbled state, as well as a location u to read to along with a translation table, and a position v to write to with an encoded memory bit, e.g. $F_k$(i||v||b). The evaluator then decodes the garbled input for the next step from the translation table by retrieving the encoded bit from memory and XORing it with the correct transition table row, e.g. α=D[u] XOR T[b]. Then the evaluator stores the encoded bit produced by the garbled CPU into D[v], e.g. $F_k$(i||v||b).

In one embodiment, cryptographic primitives can be used that are secure against the circularity present in the relations described above. We describe another embodiment, based only on one-way functions, that uses a specific construction to bypass circularity.

In this embodiment, we allow the CPU to evaluate the encoding on any value except those that have been previously evaluated. This allows us to break the circularity when determining that a certain garbled key is hidden by the mask. In one embodiment, we can use a GGM-style (see, for example, Oded Goldreich, Shafi Goldwasser, Silvio Micali, "How to Construct Random Functions", in JACM, vol. 33 no. 4, pages 792-807, 1986) construction of a PRF so that the CPU can revoke values by removing keys along the path from the root to the leaf value, and by revealing keys on the siblings to these nodes to allow for the evaluation of non-revoked values. In one example, to perform this revocation, the CPU executes a first garbled portion of the second garbled program obtained as a result of execution of a first garbled program (such as a garbled program provided to the server 104 by the client 102 in FIG. 1). This first garbled portion may be, but is not limited to, the i-th G-ckt 200 (see FIG. 2).

In one embodiment, a mini-GRAM solution can be recursively applied to larger, more powerful ones. This requires a careful balancing of the virtual mini-GRAM size and the cost of refreshing the memory. For example, this leads to a recurrence relation on the average cost of a time step: C(n)=n/f(n)+poly(k)*polylog(n)*C(f(n)), where k is the security parameter, and f is the virtual CPU size.

Remarks

Space-Time Balancing.

If n is the space and t is the time of a program, we highlight three separate interesting regimes: when t is polylog(n), when n is polylog(t) and when t and n are polynomially related. In the first regime and third regime, the overhead is poly-logarithmic in n and t respectively, in the second regime, the overhead can be driven below $n^c$ for any constant c>0, and thus one can balance time and space depending on the actual relation between the two.

Reactive Functionalities and Reusability.

In one embodiment, we can "reuse" the memory once initially garbled. A sequence of different programs and different inputs can be garbled in sequence to operate on a dynamically changing memory store that is garbled once (which mimics a reactive functionality). In this embodiment, note that these changes, once applied, cannot be rewound by the evaluator. The way to ensure this is to have the garbler maintain an ever-increasing counter. Note that we require only the garbler to choose these new programs and inputs to avoid any adaptivity issues that arise in garbling. An interesting concept is the notion of token-based obfuscation, where a reusable garbled circuit can be evaluated on multiple inputs as long as the garbler provides a new "token" for each input. Because our scheme can garble the code of a program and store it ahead of time, we achieve a somewhat different notion of token-based obfuscation: we need to garble each input, but we also need to provide garbled CPU steps that allow the evaluator to run a single step of the program, thus resulting in tokens for both inputs and "time quota".

Worst-Case Versus Per-Instance Running Time, Universal Programs, and Output Privacy.

The power of secure computation on Turing Machines and RAM programs over that of circuits is that for algorithms with very different worst-case and average-case running times, the circuit must be of worst-case size. Randomized algorithms such as Las Vegas algorithms or even heuristically good-on-average programs would benefit greatly if the online running time of the secure computation ran in time proportional to that particular instance. In our solution, though we have an upper bound T on the number of execution steps of the algorithm which affects the offline time and space, the online evaluation can have a CPU step output "halt" in the clear when the program has halted and the evaluator will then only run in time depending on this particular input. In order to further mask the program, one can consider a T time-bounded universal program $u_T$, which takes as input the code of a program and an input for that program. One can also provide an auxiliary mask so that the output of the program is blinded by this value.

Cloud Computing.

As an example of the power of our result we outline secure cloud computation/delegation. In this simple application one party has an input and wants to store it remotely and then repeatedly run different private programs on this data. Reactive functionalities allow us to do this with one important restriction: we do not give the server a choice in adaptively selecting the inputs: but this is not an issue as the server itself has no inputs to the program.

Two-Party Computation.

Note that similar to Yao's garbled circuits, in order to transmit the garbled inputs corresponding to input bits held by a different party for the sake of secure two-party computation, one can use Oblivious Transfer (OT) that can be done non-interactively in the OT-hybrid model. Here, the OT-selected inputs to our garbled program can be committed to prior to receiving the RAM garbled program, i.e. non-adaptively.

Optimizations.

We remark that step two of our blueprint is applicable to almost all ORAM schemes with small CPU as follows: instead of collapsing in the hierarchical Oblivious RAMs multiple rounds of a single read/write to a single round, we can implement our step 2 directly for each round of each read/write (e.g. even inside a single read/write simulation of Oblivious RAM that requires multiple rounds) of the underlying Oblivious RAM: by implementing an oracle call for each Oblivious RAM CPU read/write using our method of compiling memory fetch "on the fly" into garbled circuits. Any Oblivious RAM where the CPU can tell precisely when any memory location was overwritten last can be complied using our approach. (We call such Oblivious RAMs "predictive memory" RAMs and explore this further in the full version.) It also allows a generic method to "collapse" all multi-round predictive memory Oblivious RAM with small CPU into a single round. Observe that the overall complexity for garbling programs depends both on the CPU complexity and the ORAM read/write complexity.

Tighter Input Compactness.

Using an ORAM scheme that has small input encoding and small size CPU, we can also make Input Compactness in our main theorem tighter: for all programs we can make garbled inputs to be $O(nk)$, where recall that n is the input size and k is the security parameter. We remark that if we wish to garble only "large" programs that run time at least $\Omega(n \cdot \log n \cdot k^{O(1)})$, we can make Input Compactness even better under the assumption that one can encode inputs to garbled circuits to be of size $O(n+k)$ and have the garbled program "unpack" the inputs to the full $O(nk)$ size.

Stronger Adversarial Models.

As already mentioned we describe the scheme in the honest-but-curious model based on honest-but-curious Yao, and only in the non-adaptively secure setting. Since our machinery can be built on top of Yao's garbled circuits (and Obvious RAMs that work in the fully adaptive setting), techniques for stronger guarantees for Yao's garbled circuit apply in a straightforward manner to our setting as well.

Non-Interactive Garbled RAM Programs

We consider the RAM model of computation where a RAM program along with data is stored in memory, and a small, stateful CPU with a $O(1)$ instruction set that can store $O(1)$ words that can be of size $polylog(n)=poly(k)$ where k is the security parameter. Our starting point is a ORAM model that can tolerate a fully malicious tampering adversary. Each step of the CPU is simply a read/write call to main memory followed by executing its next CPU instruction. We now summarize our ideas for building Garbled RAM programs from an Oblivious RAM program.

In order to garble a RAM program $\pi t$, we consider the two fundamental operations separately and show how to mesh them together:

1. Read/Write (v, x) from/to memory.

2. Execute an instruction step to update state and produce next read/write query: $\Sigma'$, READ/WRITE (v', x')←CPU($\Sigma$, x). Updating the state can include updating local registers, incrementing program counters and query counters, and updating cryptographic keys.

Our goal is to transform this into a non-interactive process by letting the client send the server enough garbled information to evaluate the program up to t steps, where t upper bounds the RAM program running time. We give some intuition as to how to construct a circuit for each step, and then how to garble them. The first part will be modeled as the circuit $C_{ORAM}$, and the second part will be modeled as the circuit $C_{CPU}$. The circuits satisfy a novel property: the plain circuit $C_{ORAM}$ emulates a query for the ORAM client and outputs a bit representation of a garbled circuit $GC_{ORAM}$. This $GC_{ORAM}$ has output encodings that will be compatible with the garbled circuit $GC(C_{CPU})$ to evaluate a garbled the CPU's next step. We remark that $GC_{ORAM}$ actually contains several sub-circuits, but is written as a single object for ease of exposition. If we generate t of these garbled circuits, then a party can evaluate a t-time garbled RAM program by consuming one garbled $C_{ORAM}$ and one garbled CCPU per time step.

We first consider the circuit $C_{CPU}$, which is straightforward to describe. This circuit takes as input E representing the internal state of the CPU, and x the last memory contents read. Recall that the CPU performs a step CPU ($\Sigma$, x) and updates the state to E' and gives the next read/write query to memory location v' and contents x'. In order to turn this into a circuit, we can sacrifice some efficiency and have a universal instruction in which we run every atomic instruction (from its constant sized instruction set) and simply multiplex the actual results using the instruction opcode. This universal instruction is modeled as a circuit which is of size $k^{O(1)}$. We remark that although this circuit is simple, the complexity arises from when we want to garble this circuit: the garbling must be done in a way so that the garbled inputs and outputs are compatible with $GC_{ORAM}$.

The circuit $C_{ORAM}$ must emulate the client in Oblivious RAM (we can think of it as being a non-interactive client either by breaking out each individual step as a separate circuit, or using a non-interactive ORAM). The input of the circuit is just an ORAM read/write query, and the output of the circuit is a bit representation that describes a set of garbled circuits, equivalent to what would have been produced via the ORAM client which we call $GC_{ORAM}$. It is important that we argue that the result of this fetch can be combined with the evaluation of the CPU step. Observe that since the labels in our single-round ORAM are generated as pseudo-random time-labeled encodings, so we know ahead of time only the encoding of the output (but know neither the input nor output) of the i-th invocation of the single-round ORAM. Thus when garbling $C_{CPU}$, the input encodings use exactly the output encodings from the respective outputs of the ORAM. Recall in our single-round ORAM protocol the server sends back the encoded output to the client; here, we do not send it back, and instead keep the result and use it as input in the next CPU step (which is secure and correct via Lemma 1).

Then, putting it all together, to garble a RAM program $\pi_t$ that runs in time t, the program garbling algorithm G generates t garbled $C_{ORAM}$ and $C_{CPU}$ circuits, and also encodes the initial state $\Sigma_0$ of the CPU with the program initialized, counters set to zero, and with fresh cryptographic keys.

Construction of Garbled Programs

In one embodiment, our construction avoids circularity in that we use a GGM-style PRF so that the CPU can "revoke" values after evaluating on them upon reading. Each time we write back to memory, this writing is under a new PRF key, and we maintain a running list of new PRFs generated this way which can be controlled to be small if an ORAM style solution is applied. We consider a program π which we wish to garble which runs in at most T steps accessing some RAM D of size N. We let $C_i$ denote the circuit that represents the i-th CPU step, which we will describe in full detail below. At a high level, it is a circuit that takes as input some state Σ and some input bit a, some reduced PRF keys k1, ..., kr, and some auxiliary input z (used for garbled circuits encodings and other things which we describe later). It will output an updated state Σ' that is garbled under the next CPU step's encoding e, and it also outputs some information y (for reading and writing) which we will describe later. We can assume that y contains information regarding the output upon reaching a halt state for the program. As before, we assume that the input and program can be stored in a special part of memory though they can be garbled separately.

Let G be a PRF, and let F be the GGM-style construction of a PRF family using G. Let the triple (Garble, GarbleInput, GarbleEval) be a circuit garbling scheme. Let ORAM be an oblivious RAM compiler that converts any program π into an oblivious program π'. If some bit b is stored in memory location u at time t, we represent it as $F_k(t\|u\|b)$.

Garbling A Program

In one embodiment, setup produces gsk which contains a PRF key k for F and the secret key for an ORAM scheme.

In one embodiment, the contents of RAM (including the program code and input) are represented as we stated above: $F_k(t\|u\|b)$ is stored in location u if the initial bit is b. If the oblivious RAM scheme transforms the initial contents of memory D to D', then our algorithm first converts D to D', then represents each location of u of D' as $F_k(0\|u\|D'[u])$ initially, and the same process happens for the program and input.

We allow the CPU to evaluate the PRF on any value except those that have been previously evaluated. This allows us to break the circularity when determining that a certain garbled key is hidden by the PRF. We can "revoke" values as follows: For the first CPU step, we give it the root seed for the PRF k. This allows it to evaluate F on any value. Then the CPU wishes to revoke two values present in the translation table for the next CPU step. This can be done by replacing the root key k with log(n) keys which are the siblings of the values along the paths from the root to the values. At the t-th CPU step, we already previously evaluated the PRF on q values, so the reduced key will contain roughly q log(n) values.

We consider garbling a single CPU step at time t. We can first garble $C_t$ and obtain a garbled circuit $G_t$ along with a garbled encoding function $e_t$. We can then publish the garbled keys corresponding to the hardwired inputs.

The garbled CPU outputs a read location u, a translation table T, and a garbled state for the next step.

Evaluation of a Garbled Program

Suppose we have garbled the initial RAM contents D, input x and program π have been processed into the garbled memory, and we have T garbled CPU steps. In one embodiment, the CPU can perform the evaluation algorithm GE to evaluate the garbled RAM program.

The first CPU step comes equipped with all values hardwired.
Run the garbled circuit evaluator to obtain the garbled state a and values y for the next step.
Parse y as (u,T,garbled revoked keys).
For the remaining time steps:
　Fetch u from memory.
　Derive the garbled bit α=D[u] XOR T[b]
　Run the garbled circuit evaluator to obtain the garbled state σ and values y for the next step.
Parse y as (u,T,garbled revoked keys).

The last CPU circuit will output the result of the program.

We now describe how to perform writes. In one embodiment, instead of having a single PRF key k, we have a list of PRF keys $k^1, \ldots, k^q$, not all of which will be used at the same time. On the i-th write to some location u of some bit b at some time t, since we have predictable writing we know u and t but not b ahead of time, so we provide the CPU as auxiliary input the two values $F_k^i(t\|u\|0)$ and $F_k^i(t\|u\|1)$ and it will internally pick the correct one to output as the write value. Thus, whenever a location is written for the i-th time, where i is a new maximum globally, we introduce a new key $k^i$, and whenever allocations no longer use $k^i$, that key (or its reduced key) are dropped since any reads to those locations will only use $k^i$ for i>j.

We describe an embodiment that produces a recursive construction. For example, if we have a CPU of size f(n), then we only need to refresh every n=f(n) steps, but we also need to simulate this large CPU with a smaller CPU. In order to do so, we emulate the CPU as a RAM program that satisfies our predictive read, writing, and read-p properties. We can covert the circuit into a RAM program generically, and then apply ORAM to guarantee the properties we need, which incurs a poly-log overhead. We can then simulate this CPU using our GRAM construction. This simulation loses a factor of poly(k, log n) so it needs to be carefully balanced against the CPU size f. If C(n) denotes the average cost per CPU step, then we have a recurrence relation: C(n)=n/f(n)+poly(k, log n)*C(f(n)). This results in a solution that is asymptotically better than any $n^c$ for any constant c>0.

An embodiment of the invention relates to a computer storage product with a computer-readable medium having computer code thereon for performing various computer-implemented operations. The term "computer-readable medium" is used herein to include any medium that is capable of storing or encoding a sequence of instructions or computer codes for performing the operations described herein. The media and computer code may be those specially designed and constructed for the purposes of the invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs"), and ROM and RAM devices. Examples of computer code include machine code, such as produced by a compiler, and files containing higher-level code that are executed by a computer using an interpreter or a compiler. For example, an embodiment of the invention may be implemented using Java, C++, or other object-oriented programming language and development tools. Additional examples of computer code include encrypted code and compressed code. Moreover, an embodiment of the invention may be downloaded as a computer program product, which may be transferred from a remote computer (e.g., a server computer) to a requesting computer (e.g., a client computer or a different server computer) via a transmission channel. Another embodiment of the invention may be implemented in hardwired circuitry in place of, or in combination with, machine-executable software instructions.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit and scope of the invention. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A non-transitory computer readable storage medium comprising executable instructions to:
    perform a series of operations represented by a first garbled program received from a client on garbled data received from the client, a second garbled program being obtained as a result of execution of the first garbled program, the second garbled program including a first garbled portion and a second garbled portion, the second garbled portion including a third garbled portion generated through execution of the first garbled portion, such that the series of operations can be performed without interaction with the client and while maintaining as hidden the underlying content of the first garbled program and the garbled data,
    wherein the executable instructions to perform the series of operations include executable instructions to:
    execute the first garbled portion to obtain a first plurality of encrypted data elements, a plurality of addresses associated with the first plurality of encrypted data elements, and the third garbled portion; and
    execute the second garbled portion to obtain a second plurality of encrypted data elements based on the first plurality of encrypted data elements, wherein the executable instructions to execute the second garbled portion include executable instructions to execute the third garbled portion to read and to process encrypted data located at the plurality of addresses.

2. The computer readable storage medium of claim 1, wherein the first plurality of encrypted data elements include garbled processor state information and encrypted data stored in memory.

3. The computer readable storage medium of claim 2, wherein the encrypted data stored in memory is encrypted using Yao's garbled circuit encoding.

4. The computer readable storage medium of claim 2, wherein the encrypted data stored in memory is encrypted using keys dependent on location of the encrypted data in memory and dependent on epoch of encryption of the encrypted data.

5. The computer readable storage medium of claim 2, wherein the encrypted data stored in memory is encrypted in polynomial-time.

6. The computer readable storage medium of claim 2, wherein the memory is oblivious random access memory.

7. The computer readable storage medium of claim 1, further comprising executable instructions to execute the first garbled portion to compile the third garbled portion on the fly.

8. The computer readable storage medium of claim 1, wherein the first garbled portion and the second garbled portion are generated by a common reusable garbled circuit.

9. The computer readable storage medium of claim 8, wherein the common reusable garbled circuit is KD-secure.

10. The computer readable storage medium of claim 1, wherein the first garbled portion is configured to revoke a plurality of encoding values.

11. The computer readable storage medium of claim 1, wherein the first garbled portion includes a recursive, smaller version of itself that is configured to perform operations represented by the first garbled program.

* * * * *